Aug. 19, 1924.

J. R. QUAIN 1,505,603

OZONE APPARATUS

Filed Dec. 27, 1922     3 Sheets-Sheet 1

Fig.1.

Witnesses:-
Birney Hines
Fred C. Williams

Inventor:
John Robert Quain
By Chesley G. Carr
Attorney.

Patented Aug. 19, 1924.

1,505,603

UNITED STATES PATENT OFFICE.

JOHN ROBERT QUAIN, OF WESTMINSTER, LONDON, ENGLAND.

OZONE APPARATUS.

Application filed December 27, 1922. Serial No. 609,309.

*To all whom it may concern:*

Be it known that I, JOHN ROBERT QUAIN, a subject of the King of Great Britain, and a resident of Westminster, London, England, have invented a new and useful Improvement in Ozone Apparatus, of which the following is a specification.

My invention relates to ozone apparatus of the kind in which ozone is produced from atmospheric air by the application of high tension electric currents to electrodes separated by a dielectric.

One object of my invention is to provide an apparatus of simple and economical construction. Another object of my invention is to provide an ozone apparatus which will produce and deliver to the surrounding atmosphere relatively large quantities of ozone whilst consuming a relatively small amount of electrical energy. A further object of my invention is to provide a self-contained domestic and therapeutic ozone apparatus suitable for use in rooms, hospitals and other interiors and which contains, in addition to the aforesaid electrodes and intervening dielectric, devices for the conversion of low tension current into high tension current, and which will deliver and diffuse into the atmosphere the produced ozone without the necessity for fans or other mechanical air circulating means. A still further object is to provide a self-contained domestic apparatus which, in addition to the production of ozone may be used for supplying high frequency current to electric treatment devices such as evacuated applicator bulbs.

Figure 2:
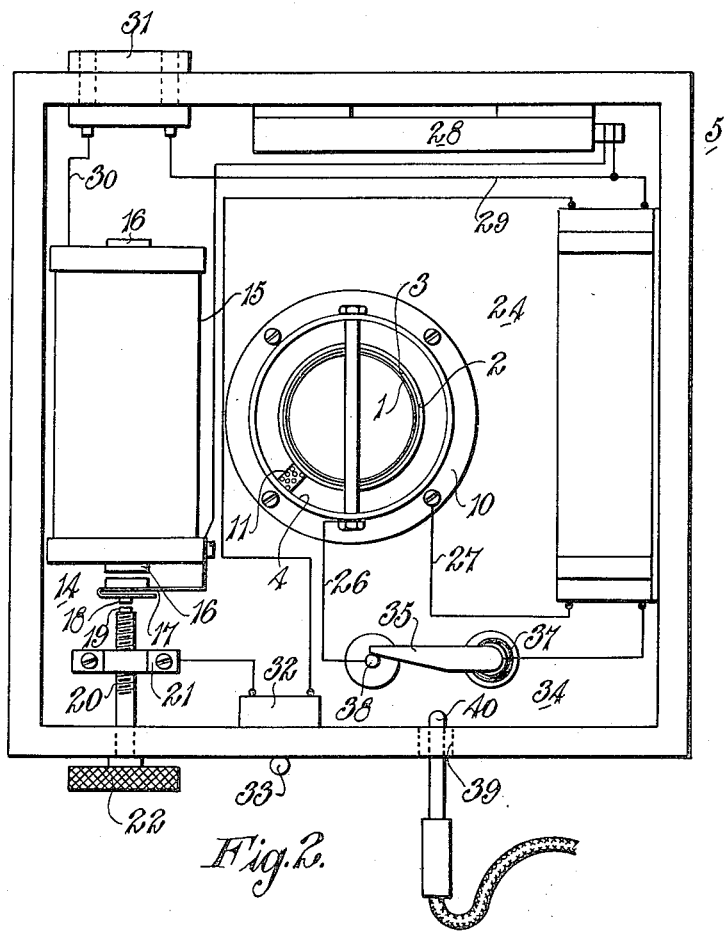
Figure 3:
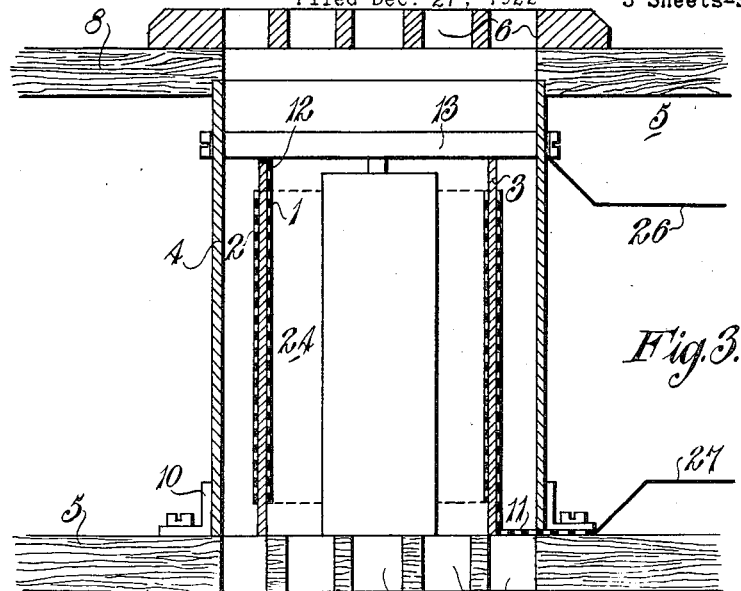
Figure 4:
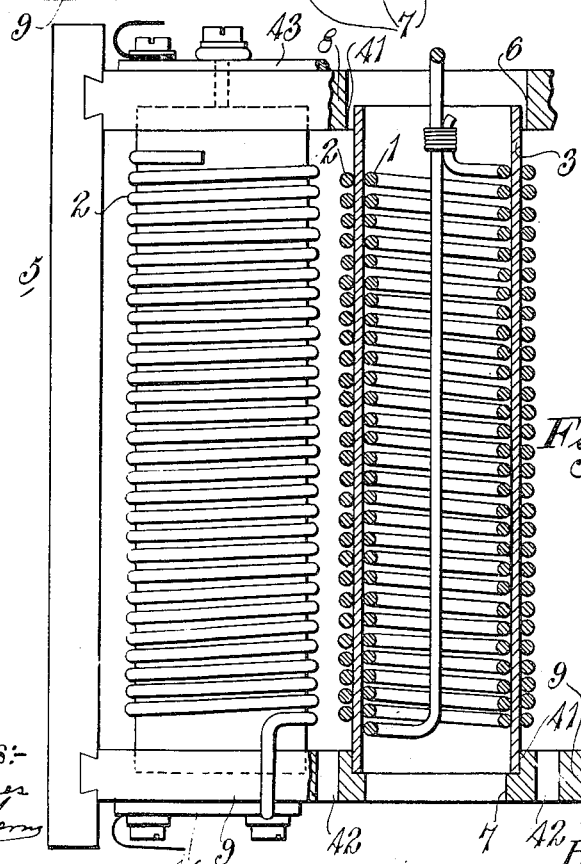

I attain these and other objects by the devices illustrated in the accompanying drawings in which Fig. 1 is a diagram shewing an ozone producing element according to the invention together with electrical apparatus for converting low tension current into high tension current; Fig. 2 is a plan view by way of example of one form of self-contained ozone apparatus, with the lid of the casing thereof removed; Fig. 3 is a sectional elevation on a larger scale of part of the ozone apparatus illustrated in Fig. 2, and Fig. 4 is a fragmentary elevation, partly in section, of an ozone apparatus having a plurality of the ozone producing elements arranged in accordance with the invention.

In carrying out the invention according to one arrangement thereof the ozone producing element is of the kind in which one or both of the electrodes is or are in contact with the dielectric at a plurality of points so that the air has access to one or both surfaces of the dielectric through which the electric discharge takes place and the said surfaces of the dielectric are vertically disposed so as to offer a small resistance to vertical flow and to favour the production of convection currents along said surfaces and along the point-contacting electrode or electrodes. The said element is surrounded by a vertically disposed conduit or chimney which is open at both ends and which serves to increase the convection currents. Said conduit or chimney may be arranged to communicate with one or more openings in both the top and the bottom of a casing or container for the various devices of the ozone apparatus so that the ozonized air does not come into contact with said devices.

Referring to the drawings, wherein like reference numerals indicate similar parts, 1 and 2 represent the electrodes to which the high tension current is supplied and 3 represents the solid dielectric which separates the electrodes 1 and 2. In the preferred arrangement the electrodes 1 and 2 and the dielectric 3 are of cylindrical shape, the dielectric being of fused silica whilst the electrodes 1 and 2 consist of non-oxidizable metal which is either transversely corrugated, perforated or otherwise configured, or is in the form of a helix, so as to present a plurality of contact points or surfaces to the dielectric on one or both sides thereof. The invention, however, is not limited to the use of point contacting electrodes since electrodes having smooth surfaces may be employed if desired. The conduit or chimney which surrounds the ozone producing element 1, 2 and 3 is indicated at 4 and comprises, according to a preferred construction, a cylinder of non-resonant insulating material which is concentric with said element and of greater diameter than the latter so as to be spaced therefrom.

I have found that by utilizing a thin fused silica dielectric having a wall thickness of from 1 to 2 mm. and by applying to the electrodes a high tension current of approximately 10,000 volts potential difference per 1 mm. thickness of dielectric, I am able to produce a relatively large quantity of ozone for a small current consumption, and also to generate just sufficient heat at the electrodes to produce such convection currents within the conduit or chimney 4 as to be effective in supplying the requisite quantity of oxygen at the proper rate to the electrodes for ozonization and in throwing the ozonized air out of the container of the ozone apparatus into the surrounding atmosphere. I have further found that these results may be efficiently obtained without the generation of sufficient heat to effect decomposition of the ozone and the consequent production of undesirable oxides of nitrogen.

The ozone producing element and conduit or chimney 4 may be disposed within a casing or container 5 and in the case of the self-contained apparatus illustrated in Figs. 2 and 3, the chimney 4 communicates at its ends with openings 6 and 7 in the top 8 and base 9 respectively of said container. A plurality of small openings are preferably employed to obtain a more even distribution of the air through the conduit or chimney 4 and to obtain good diffusion of the ozonized air when thrown into the surrounding atmosphere. The top 8 of the container may in some cases constitute a hinged or removable lid, in which case said conduit or chimney 4 may rest upon and be secured to the base 9 by means for example of a flanged ring 10. The dielectric cylinder 3 may rest upon the base 9 whilst the outer electrode 2 is provided with a downward and lateral extension 11 which is clamped beneath the channel ring 10 so that the latter constitutes one terminal of the ozone producing element. The inner electrode 1 may be provided with an upward extension 12 secured to a metal rod 13 which passes diametrically across the conduit 4 and constitutes the other terminal of the element, said rod also serving to retain the dielectric 3 in position. The electrodes 1 and 2 are made of less axial length than the dielectric cylinder 3 in the usual manner.

A suitable apparatus for converting the low tension currents such as are obtainable from house lighting and other supply mains comprises an electromagnetic make-and-break device or vibrator 14 which consists of a coil 15 surrounding a core 16 of magnetizable material which is arranged to attract a resilient armature member or trembler 17 carrying a contact 18 co-operating with a fixed contact 19. The contact 19 is preferably carried upon a screw 20 engaged in a terminal bracket 21, said screw passing through the side of the casing 5 and carrying an external knob 22 by means of which the vibrator 14 may be adjusted as will be well understood. The make-and-break device or vibrator 14 converts the supply current into intermittent current and such intermittent current passes through the primary winding 23 of a step-up transformer 24 the secondary winding 25 of which is connected by conductors 26 and 27 to the electrodes 1 and 2 respectively.

A condenser 28 is connected in shunt between the trembler 17 and the main conductor 29 leading to the primary winding 23 of the transformer 24 in the usual manner. The main leads 29 and 30 of the current converting apparatus are connected with a plug socket device 31 which can be connected by means of an adaptor with the source of low tension supply current. A switch 32 with an external knob 33 is suitably arranged in the lead 29 as shown or may be arranged in the lead 30 if more convenient. It will be obvious that either direct-current or alternating-current may be supplied to the make-and-break device 14 and primary winding 23 of the transformer.

In the arrangement above described it will be observed that since the conduit or chimney 4 communicates with openings in the top and base of the container 5 the ozone cannot come into contact with the devices disposed within said container in appreciable quantities so that it is unnecessary to provide any special protection for said devices against the oxidizing effects of the ozone. Furthermore such arrangement permits of said devices being themselves substantially completely enclosed which is advantageous in reducing the noise emitted by the vibrator 14. The latter is preferably mounted in the known manner upon a pad of non-resonant material (not shewn) such as felt so that the vibrations are not communicated to the container 5.

In some cases the convection effect which occurs within the conduit or chimney 4 may be increased by the provision within or below said conduit of a small incandescent lamp, preferably of the carbon filament type, or of some other convenient form of electric heater. Or in some cases the transformer 24 may be located within the cylindrical electrodes as indicated in Fig. 2 so that the heat normally developed in the coils of the said transformer may be utilized for increasing the convection currents. The transformer when so disposed should be provided with a protective covering of wax or other non-oxidizable material. In some cases a core of non-resonant material may be located within the cylindrical electrodes in place of the transformer 24.

In the case of the self-contained apparatus such as illustrated in Figs. 2 and 3, the current conversion devices may be used for supplying current to high frequency treatment devices such as evacuated applicator bulbs and to this end a switch 34 (Figs. 1 and 2) may be arranged in the high tension lead 26. The switch 34 advantageously comprises a switch arm 35 which is pivoted on a vertical axis 36 connected with the secondary winding 25 of the transformer 24 and urged by a spring 37 (Fig. 2) into engagement with a fixed contact 38 connected with the electrode 1 of the ozone producing element. When the switch arm 35 occupies the illustrated full line position, the circuit between the secondary winding 25 of the transformer 24 and the ozone producing element is complete. A perforation 39 (indicated by dotted lines in Fig. 2) is formed in the side of the casing or container 5 and the terminal plug 40 (also shewn in dotted lines) of a high frequency applicator device (not shown) is adapted to be passed into said opening 39 and to engage the switch arm 35 and to move it to its illustrated dotted line position wherein the lead 27 is interrupted and the secondary winding 25 electrically connected to the terminal plug 40 of the applicator. When the terminal plug 40 is removed from the perforation 39 the switch arm 35 automatically returns to its closed position.

Where large quantities of ozone are required to be produced, instead of employing a single ozone producing element such as described in connection with Figs. 1, 2 and 3, several such elements may be mounted within the conduit or chimney 4 between upper and lower supporting members 8 and 9 as shown in Fig. 4. In the case of such larger installations the devices for producing the high tension current will usually be separated from the ozone producing elements. In such case the container or casing 5 may itself constitute the conduit or chimney, the ozone producing elements being arranged relatively near together and the walls of the container closely surrounding them. In this manner the necessary convection currents are obtained. The lower support 9 constituting the base of the container 5 is provided with a plurality of recesses in each of which is disposed the lower end of a dielectric cylinder 3. The base 9 is provided with a plurality of perforations 7 severally in alignment with the dielectric cylinders. The upper support or top 8 is provided with a plurality of perforations 6 which are severally in alignment with and surround the ends of the dielectric cylinders 3 and are of greater diameter than the latter so as to provide annular openings 41. The air supplied to the inner electrodes 1 enters the perforations 7. Small perforations 42 are provided in the base 9 for the admission of the air to the outer electrodes 2 and such air after being ozonized passes through the annular openings 41. If preferred a separate conduit 4 may be used for each ozone producing element. The inner electrodes 1 may be connected to a bus-bar 43 part of which is shewn attached to the upper support or top 8 whilst the outer electrodes may be similarly connected to a bus-bar 44 part of which is shewn attached to the lower support 9.

It will be understood that the casing 5 will be provided with suitable feet or legs (not shown) so that air may reach the lower openings 7 and 42. Or the apparatus may be supported upon suitable brackets attached to a wall for example.

While I have shown the apparatus and electrical connections therefor in the preferred form, it is apparent that numerous modifications of both may be made without departing from the spirit of the invention. For example, I do not limit myself to the use of cylindrical electrodes and silica dielectrics since these may assume other forms. I desire therefore to be limited only by the scope of the appended claims.

I claim as my invention:—

1. An ozone apparatus comprising in combination, a pair of electrodes, a solid dielectric disposed between said electrodes and presenting vertical surfaces with which said electrodes make contact at spaced intervals and a vertical conduit surrounding said electrodes and dielectric.

2. An ozone apparatus comprising in combination, a pair of electrodes, a solid dielectric disposed between said electrodes and presenting vertical surfaces with which said electrodes make contact at uniformly spaced intervals and a casing containing said electrodes and dielectric, said casing having perforations in its top and base and closely surrounding said electrodes and dielectric so as to constitute a conduit for convection currents passing the electrodes.

3. An ozone apparatus comprising in combination a pair of electrodes, a dielectric disposed between said electrodes with which each makes contact at spaced intervals, a container for said electrodes and dielectric, said container having perforations in its top and base respectively, and a vertical conduit surrounding said electrodes and dielectric and communicating at its ends with said perforations.

4. An ozone apparatus comprising, in combination, a pair of electrodes, a dielectric disposed between said electrodes and with which each makes contact at spaced intervals, means for converting low tension electric current into high tension current, a casing containing said electrodes, dielectric and current converting means, and a vertical conduit surrounding said electrodes and dielectric and passing through said casing from base to top thereof.

5. An ozone apparatus comprising a plurality of ozone producing elements each consisting of a pair of electrodes, a dielectric disposed therebetween with which each electrode makes contact at spaced intervals, and a vertical conduit surrounding all of said dielectrics.

6. An ozone apparatus comprising a plurality of ozone producing elements each consisting of a pair of vertically disposed cylindrical electrodes, a cylindrical solid dielectric disposed therebetween with which each of said electrodes makes contact at spaced intervals, a container for said elements, said container closely surrounding said elements and having a plurality of pairs of vertically aligned perforations in its top and base respectively, said pairs of perforations being each in substantial alignment with an ozone producing element.

7. An ozone apparatus comprising a pair of vertically disposed tubular electrodes, a vertically disposed tubular dielectric between said electrodes, a vertical conduit surrounding said electrodes and dielectric and spaced therefrom, and a vertical core disposed within said tubular ozone producing elements and spaced therefrom.

8. An ozone apparatus comprising a solid dielectric, a pair of electrodes disposed on respective sides of said dielectric and each making spaced contact therewith at a plurality of points, and a vertical conduit surrounding said electrodes and dielectric.

9. An ozone apparatus comprising a solid dielectric, a pair of openwork electrodes disposed on the respective sides of said dielectric and each making spaced contact therewith at a plurality of points, and a vertical conduit surrounding said electrodes and dielectric and spaced a short distance therefrom.

10. An ozone apparatus comprising in combination a thin silica dielectric, a pair of electrodes disposed on the respective sides of said dielectric and making spaced contact therewith, a vertical conduit surrounding said electrodes and dielectric and devices for supplying to said electrodes an electric current having a tension of approximately 10,000 volts per 1 mm. thickness of the silica dielectric, and a conduit surrounding said electrodes and dielectric.

11. An ozone and high frequency treatment apparatus comprising an ozone producing element, means for converting low tension current into high tension high frequency current and a two-way switch by means of which either the ozone producing element or a high frequency treatment device may be supplied with high frequency current.

12. An ozone and high frequency treatment apparatus comprising an ozone producing element, means for converting low tension current into high tension high frequency current, a spring controlled switch which normally connects the ozone producing element with the source of high tension current, a socket adapted to receive a contact plug connected with a high frequency treatment device said socket being so located with respect to said switch that upon the insertion of the contact plug therein the ozone producing element is disconnected from said current source and the plug connected thereto.

In testimony whereof I have hereunto subscribed my name this eighth day of December, 1922.

JOHN ROBERT QUAIN.